(12) United States Patent  
Caruel (10) Patent No.: US 9,366,201 B2  
(45) Date of Patent: Jun. 14, 2016

(54) CASCADE-TYPE THRUST REVERSER WITH ONE-PIECE MOBILE COWL

(71) Applicant: AIRCELLE, Gonfreville l'Orcher (FR)

(72) Inventor: Pierre Caruel, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 93 days.

(21) Appl. No.: 14/263,290

(22) Filed: Apr. 28, 2014

(65) Prior Publication Data

US 2015/0285185 A1 Oct. 8, 2015

Related U.S. Application Data

(63) Continuation of application No. PCT/FR2012/052340, filed on Oct. 15, 2012.

(30) Foreign Application Priority Data

Oct. 31, 2011 (FR) .................................. 11 59867

(51) Int. Cl.  
*F02K 1/76* (2006.01)  
*F02K 1/72* (2006.01)

(52) U.S. Cl.  
CPC . *F02K 1/72* (2013.01); *F02K 1/763* (2013.01); *F02K 1/766* (2013.01); *F05D 2230/80* (2013.01); *Y02T 50/671* (2013.01)

(58) Field of Classification Search  
CPC ........... F02K 1/72; F02K 1/763; F02K 1/766; F02K 1/76; F05D 2260/30; B64D 29/06; Y02T 50/671  
See application file for complete search history.

(56) References Cited

U.S. PATENT DOCUMENTS 5,778,659 A 7/1998 Duesler et al.  
2013/0280031 A1* 10/2013 Hurlin ..................... F01D 5/005  
415/1

FOREIGN PATENT DOCUMENTS

| EP | 2 138 697 A2 | 12/2009 |
| FR | 2 911 372 | 7/2008 |
| FR | 2 952 681 | 5/2011 |
| FR | 2 952 908 | 5/2011 |

OTHER PUBLICATIONS

International Search Report issued Nov. 27, 2012 in International Application No. PCT/FR2012/052340.

* cited by examiner

*Primary Examiner* — Phutthiwat Wongwian  
*Assistant Examiner* — Stefan Ibroni  
(74) *Attorney, Agent, or Firm* — Burris Law, PLLC (57) ABSTRACT

A thrust reverser for a nacelle of a turbojet engine includes deflecting cascades and an external cowl which translates from a closure position to an opening position by a set of control cylinders being attached by their ends to the external cowl. The deflecting cascades are supported by a front frame and a rear frame respectively and are enclosed in an envelope formed by a fan carter and by a fan cowl. The thrust reverser further includes a lock which is able to connect or disconnect the deflecting cascades to the external cowl. When the lock is unlocked, the set of control cylinders translate the external cowl alone in downstream direction while in the lock position, the control cylinders translates the external cowl and the deflecting cascades together in downstream direction.

11 Claims, 5 Drawing Sheets

# CASCADE-TYPE THRUST REVERSER WITH ONE-PIECE MOBILE COWL

CROSS-REFERENCE TO RELATED APPLICATIONS

This application is a continuation of International Application No. PCT/FR2012/052340, filed on Oct. 15, 2012, which claims the benefit of French Patent Appln. No. FR 11/59867, filed on Oct. 31, 2011. The disclosures of the above applications are incorporated herein by reference.

FIELD

The present disclosure relates to a thrust reverser for a turbojet nacelle and also a turbojet engine nacelle including a thrust reverser.

BACKGROUND

The statements in this section merely provide background information related to the present disclosure and may not constitute prior art.

An aircraft is driven by several turbojet engines, each being housed in a nacelle also housing a set of secondary actuating devices related to its operation and performing various functions when the turbojet engine is operating or stopped. These secondary actuating devices comprise in particular a thrust reverser actuating mechanical system.

A nacelle generally presents a tubular structure comprising an air intake upstream to the turbojet engine, a middle section designed to surround a fan of the turbojet engine, a downstream section comprising thrust reverser means and designed to surround the combustion chamber of the turbojet engine, and is usually completed by a nozzle of ejection the output of which is located downstream to the turbojet engine.

The modern nacelles are designed to house a turbojet engine with double flows able to generate, through the blades of the rotating fan, a flow of hot air (primary flow) and a flow of cold air (secondary flow) which circulates outside the turbojet engine through an annular passage, also called vein, formed between a fairing of the turbojet engine and an internal wall of the nacelle. The two air flows are ejected from the turbojet engine by the back of the nacelle.

The role of the thrust reverser is, when landing an aircraft, to improve its braking capability by redirecting to the front at least part of the air ejected by the turbojet engine. In this phase, the thrust reverser blocks at least a part of the vein of the cold flow and redirects this flow towards the front of the nacelle, thereby generating a counter thrust which is added to the braking of the wheels of the aircraft.

A common structure of a thrust reverser comprises an enclosure wherein is provided an opening designed for the diverted flow, which, while operating as a direct jet of the nacelle, is closed by an external cowl and which, while operating as reverse jet of the nacelle, is opened by displacement in a downstream translation (by reference to the direction of the gas flow) of the external cowl, by means of displacement cylinders of the external cowl, said displacement cylinders being mounted on a frame of the enclosure upstream to the opening.

The external cowl is often formed by two half-cowls having an essentially semi-cylindrical shape, which are articulated in the upper part (so-called at 12:00 position) on hinges significantly parallel to the direction of translation of the external cowl, and which are closed by locks on the bottom part (called at 6:00 position).

This disposition allows, for maintenance operations, accessing inside the nacelle, and particularly to the turbojet engine or to an internal structure of the reverser by opening these half-cowls.

In order to solve some problems related to such a 'Butterfly' opening, an opening in translation solution has been developed and is particularly described in French Patent Appln. No FR 2 911 372. This application describes a structure of a thrust reverser comprising an external set into one single part, in other words, without closing in the lower part. Such a structure is called monoblock structure or O-shaped structure.

French Patent Appln. No. FR 2 952 681 also describes an O-shaped structure comprising a thrust reverser with fixed cascades while operating of the nacelle in direct jet or in reverse jet, and the whole set of which is formed by the external cowl and the cascades translate during maintenance operations, allowing easier access to the engine. Deflecting cascades are connected to the fan housing by their front frame and the disconnection of the front frame from the fan housing is necessary when reaching the engine during maintenance operations is desired.

Disadvantages associated with these solutions lie in the complexity of the disconnection system between the front frame of the cascades and the fan housing. Indeed, the disconnection of the cascades attached to the fan housing is complicated manually because access to the system of disconnection is restricted. On the other hand, such an opening system for the maintenance operations requires an opening system separate from that used to open the external cowl during an operation in reverse jet of the nacelle, which greatly increases the weight of the nacelle and goes against solving the problem of reduction of weight, recurring in aeronautics.

Besides, another recurring problem related to the nacelles for turbojet engine is that the dimensions of the nacelle and of the associated cowl are too important, leading to increases in drag.

Indeed, the length of the cascades necessary to the deflection of flow is determined by the cold flow rate. Because of aerodynamic constraints, they also occupy a certain volume within the thrust reverser cowl what can generate important dimensions of the reverser cowl and the nacelle.

There is thus a need to limit the dimensions of the cowl and of the nacelle and, consequently, to reduce the mass and the drag of the latter.

SUMMARY

A thrust reverser is provided, comprising movable cascades wherein the cascades are housed between a housing and a fan cowl during an operation in direct jet of the nacelle, and translating with an external cowl during a functioning in reverse jet of a nacelle. This allows to reduce the axial length of the nacelle and of the associated cowl, resulting in a reduction in weight and drag.

The present disclosure provides a short nacelle equipped with a monoblock external cowl, for which the passage from a functioning position to a maintenance position is easy to perform.

In particular, the present disclosure provides a thrust reverser for nacelle of turbojet engine comprising:
  at least one mobile external cowl in translation from a position called closure position to at least a position called opening position,
  means for actuating comprising a set of control cylinders with the end of at least one cylinder being attached to the external cowl, means of thrust reversal comprising at least deflecting cascades supported at their upstream end by a front frame and at their downstream by a rear frame, and enclosed in an envelope formed by a fan housing and a fan cowl, means of fixing said deflecting cascades on the external cowl, said means being able to be locked/unlocked, said thrust reverser being remarkable in that the activation of the actuating means causes the opening/closing of the external cowl, allowing a displacement of the external cowl and of the deflecting cascades together when the means of fixing are locked, and a displacement of the single external cowl when the means of fixing are unlocked.

Thanks to the present disclosure, a unique set of actuators allows the cowl to translate from a closed position corresponding to the functioning of the nacelle in direct jet towards at least one opening position corresponding either to the functioning of the nacelle in reverse jet or to the maintenance position of the said nacelle.

Deflecting cascades being attached to the external cowl thanks to the locked means of fixing, said cascades slide either in relation to the engine pylon, or in relation to the fan housing, along with said cowl, upon activation of the actuating means, having then for effect to uncover the cascades from their envelope, and consequently to deviate at least one part of a flow of air through a vein of the nacelle.

During a maintenance operation, the means of fixing are manually unlocked, allowing the separation of the deflecting cascades from the external cowl. Thanks to this easy-to-achieve handling, activation of the actuating means allows then the displacement of the external cowl only, in a position such that the access to the engine is simplified.

According to the present disclosure, the set of control cylinders is activated by a single control source.

Thanks to this disposition, one is freed from the use of different sources of control, depending on whether the nacelle is in operating position or in maintenance position. This also allows the reduction of the weight of the nacelle, recurring goal in aerospace.

Moreover, the whole of control cylinders comprises at least one cylinder called higher cylinder and at least one cylinder called lower cylinder.

According to a feature of the present disclosure, at least the higher cylinders are connected by one of their ends to the upstream face of the external cowl.

According to another characteristic of the present disclosure, the higher cylinders and the lower cylinders are connected by one of their ends to the upstream face of the external cowl.

Thanks to this disposition, the set of the cylinders participates in the opening of the external cowl.

Advantageously, lower cylinders are connected by one of their ends to the rear frame of the deflecting cascades.

The lower cylinders are able to be disengaged from the source of control thanks to a clutch device.

Because of these characteristics, lower cylinders are able to be temporarily disconnected from the source of control thanks to the clutch system, what allows, during maintenance operations of the nacelle for example, and this without manually disabling the lower cylinders, to access during the activation of the actuating means to the only opening of the higher cylinders.

This disposition is advantageous in maintenance position of the nacelle, particularly in order to improve the access to the engine.

According to a characteristic of the present disclosure, the means of fixing comprise at least one lock attached to the external cowl and at least one receiving member of said locks, attached to the deflecting cascades.

Locks are closed when the nacelle is operating, and are manually opened during maintenance operations of the nacelle.

The deflecting cascades are, through locks of security, attached to at least one fixed set of the nacelle and/or to the link interface with the engine pylon to which said nacelle is designed to be connected.

This disposition constitutes a line of defense, allowing to secure the holding of the thrust reversal cascades to a fixed set of the nacelle constituted by the inlet air of the nacelle or the fan housing for example. This holding is necessary for a use of the nacelle in direct jet mode, so that the cascades are not uncovered unintentionally. Furthermore, thanks to the present disclosure, these lines of defense need not be disconnected upon opening of the external cowl for the maintenance operations, said cowl being disconnected from the deflecting cascades by opening the means of fixing.

Finally, axial abutments are fixed between the front frame of the deflecting cascades and the fixed set of the nacelle.

Advantageously, during a functioning in reverse jet of the nacelle, axial efforts induced by the deflecting cascades, the shutters and the external cowl are transmitted directly to the fixed sets of the nacelle without going through the cylinders, and can thus be better angularly distributed so as to limit the constraints concentrations in the structure.

The present disclosure also relates to a nacelle for turbojet aircraft comprising at least one thrust reverser according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
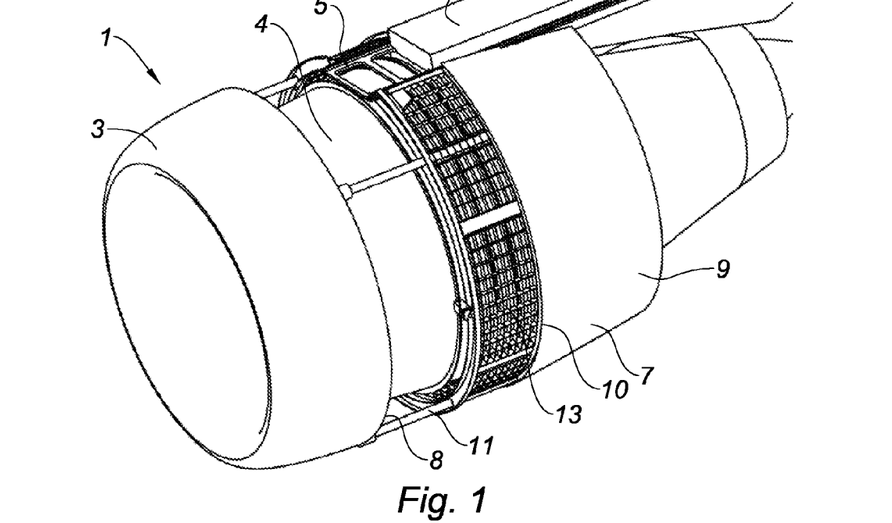
FIG. 1 schematically represents a nacelle of the turbojet engine according to the present disclosure, operating in direct jet.

FIG. 1 is a general schematic representation of a nacelle 1 of the turbojet engine (not represented) suspended under a wing (not represented) by means of a small block 2 designed to serve as an interface of connection with an engine pylon (not represented).

This nacelle 1 is classically subdivided into an upstream air inlet section 3, a middle section 5 comprising a fan cowl (not visible), a fan (not visible) of the turbojet engine and its housing 4, and a downstream section 7 housing a thrust reverser device enclosed in an external cowl 9, and possibly a section of terminal nozzle.

Upstream and middle sections 3 and 5 of the nacelle 1 constitute a fixed set of the nacelle, while downstream section 7 constitutes a mobile set of the nacelle.

The represented nacelle has a downstream section called "O-shaped" section, that is, the external cowl 9 is formed by "monoblock" cowl. By "monoblock" cowl, one means a cowl in an almost-annular shape, extending from one side of the engine pylon to the other side without interruption. Such a cowl is often referred to by the Anglo-Saxon terms "O-duct", in reference to the ferrule shape of such a cowl, as opposed to the "D-duct", which comprises in fact two half-cowls, each one extending on a half-circumference of the nacelle.

In FIG. 1, the nacelle is represented in functioning in direct jet. The thrust reverser device is in a closed position, that is, the external cowl 9 of the downstream section 7 is in a position called closure position. During such an operation of the nacelle 1, the flow of cold air "F" passes through the vein "V," formed by the fairing of the turbojet engine and the internal wall of the nacelle, from the air inlet 3 to the output section of the nacelle.

The external cowl 9 is made mobile in translation by the activation of the actuating means 11. These actuating means may be constituted for example by a set comprising a plurality of control cylinders connected by one of their ends to an upstream face 10 of the external cowl 9.

The external cowl 9 is able to translate along a rail provided on the block 2 of the engine pylon, from a position called closure position to at least an opening position, or vice versa.

Figure 2:
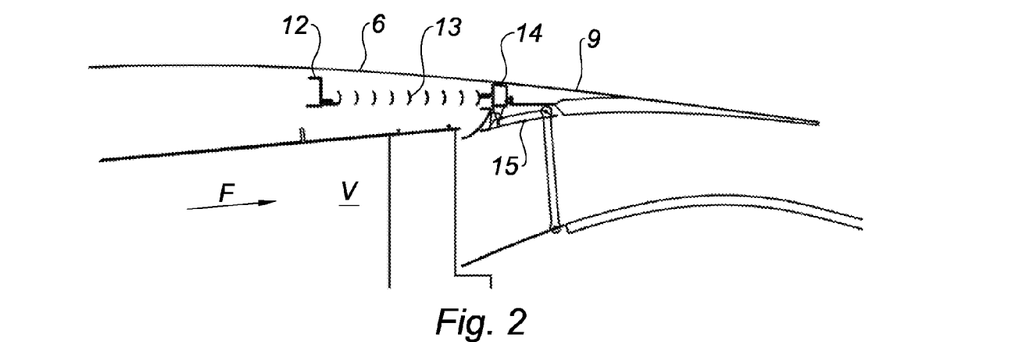
FIG. 2 is a sectional view of the nacelle according to FIG. 1, centered on the middle sections and downstream of said nacelle.

We now refer to FIG. 2, representing a sectional view of the nacelle, operating in direct jet, centered on the middle and downstream sections.

A fan cowl 6 is positioned on the fan housing 4, between the downstream face 3 of the air inlet 8 and the upstream face 10 of the external cowl 9, forming an envelope.

This envelope houses, while functioning in direct jet of the nacelle, deflecting cascades 13 designed to redirect at least a part of said flow of cold air towards the upstream of the nacelle, when said cascades are uncovered from the envelope, corresponding to an operation of the nacelle in reverse jet, as described below.

The deflecting cascades 13 are conventionally supported at their upstream end by a front frame 12 and at their downstream end by a rear frame 14.

Thrust reverser flaps 15, together with the deflecting cascades 14, form thrust reversal means of the nacelle 1.

These flaps 15 are attached to the rear frame 14 of the deflecting cascades 13. While an operation in a direct jet of the nacelle, such as the one represented on FIG. 2, said flaps are in a position called closed position and provide the internal aerodynamic continuity of the downstream section 7 of the nacelle.

When the cascades are in a closed position, it allows preventing the deployment of the flaps 15 and the redirection of air towards the outside of the nacelle.

Figure 3:
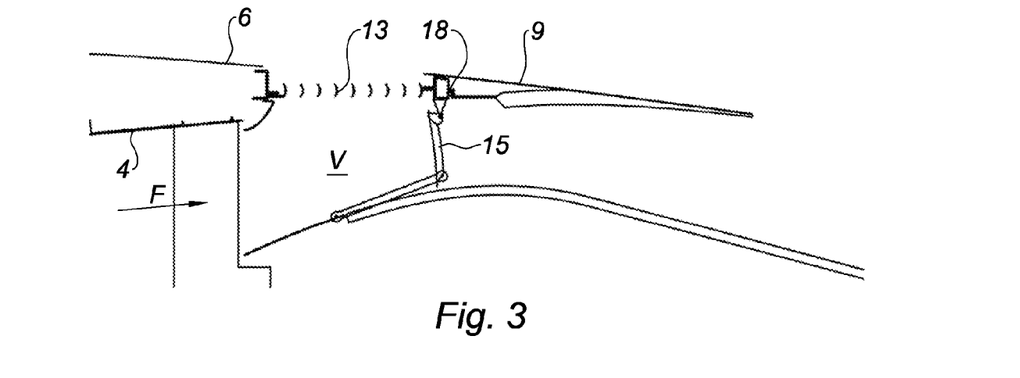
FIG. 3 is a sectional view of the nacelle, functioning in reverse jet.

FIG. 3 represents an opening position of the external cowl, corresponding here to an operation in reverse jet of the nacelle 1.

In such a position, deflecting cascades 13 and the external cowl 9 are moved back downstream of the nacelle.

The deflecting cascades are downstream of the envelope formed by the cowl 6 and the fan housing 4 of the fan, thus becoming functional to allow at least to a part of the flow of air "F" crossing the vein "V" to escape from the nacelle and to be redirected to the upstream of the nacelle.

While an operation in reverse jet of the nacelle, such as the one represented in FIG. 3, thrust reversal flaps 15 have been rotated compared to the operation in direct jet mode of the nacelle. These flaps are then in a position called open position and at least partially obstruct the air flow "F" circulating the vein "V". They contribute to the redirection of at least one part of the flow of air "F" through the deflecting cascades 13.

Figure 4:
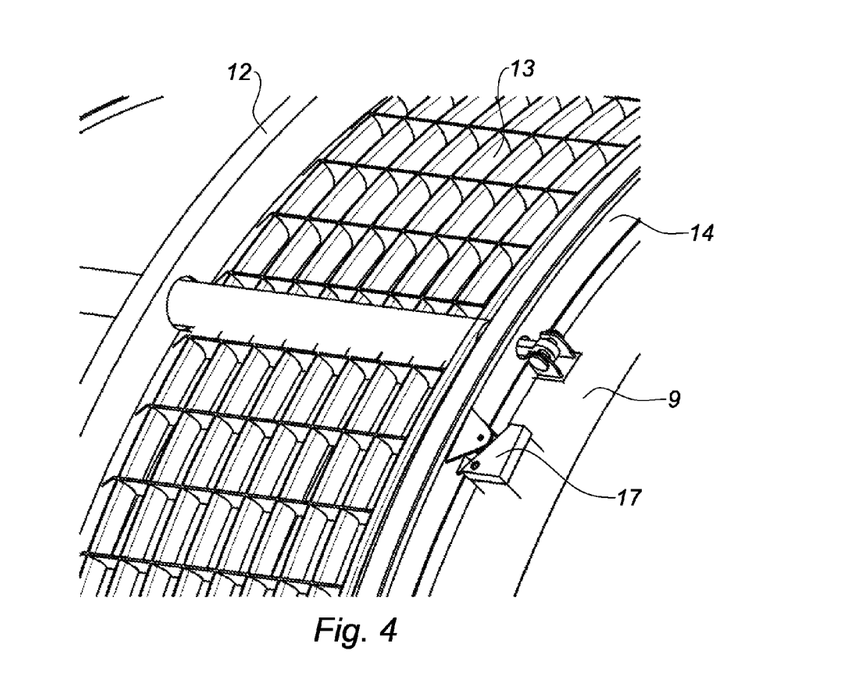
FIG. 4 schematically represents the fixation between the deflecting cascades and the external cowl.
Figure 5A:
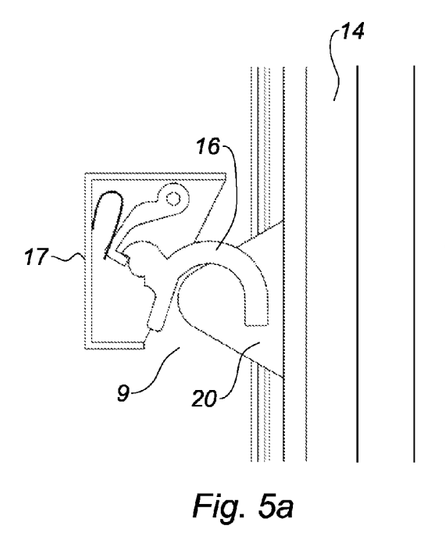
FIGS. 5a and 5b represent the fixation of the rear frame of the deflecting cascades and the external cowl, respectively in the locked and the unlocked position.
Figure 5B:
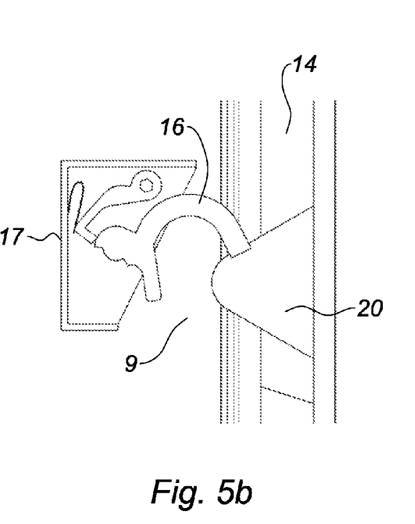

We now refer to FIGS. 4 and 5, representing the connection between the deflecting cascades 13 and the external cowl 9.

Deflecting cascades 13 are made attached to the external cowl 9 by means of fixing 17.

Such detachable fixing means allow the connection between the rear frame 14 of the deflecting cascades 13 and the external cowl 9.

These fixing means shall be all known means, such as bolts, lock systems, etc.

Referring to FIG. 5a, illustrating the nacelle in the operating mode, the fixing means 17 consist in at least one lock 16 attached to the external cowl 9 engaged in a receiver member such as a strike 20, attached to the rear frame 14 of the cascades 13.

The deflecting cascades 13 are thus attached to the external cowl 9, the cowl and the cascades thus forming a unitary set able to be moved together upon activation of the actuating means 11.

Upon maintenance operations, and as described in more details below, an operator manually opens the locks 16 in order to disconnect the deflecting cascades from the external cowl 9 (FIG. 5 b), allowing thus the translation towards the downstream of the external cowl 9 only, in order to provide accessibility inside the nacelle 1.

The sealing between the rear frame 14 of the cascades 13 and the external cowl 9 can be achieved thanks to a gasket 18 (see FIG. 3).

The operating mode of the thrust reverser according to the present disclosure is as follows:

During a phase of flight of an aircraft, the nacelle 1 is in an operating mode, as opposed to a maintenance mode where the aircraft is on the ground.

In the functioning mode of the nacelle, one distinguished between an operation in direct jet of said nacelle, for which the external cowl 9 is in the closure position, and an operation in reverse jet of the nacelle, for which the external cowl 9 is located in the opening position.

When the nacelle is in the operating mode, the fixing means 17 are in a locked position as previously described. The deflecting cascades 13 are attached to the external cowl 9.

Figure 6:
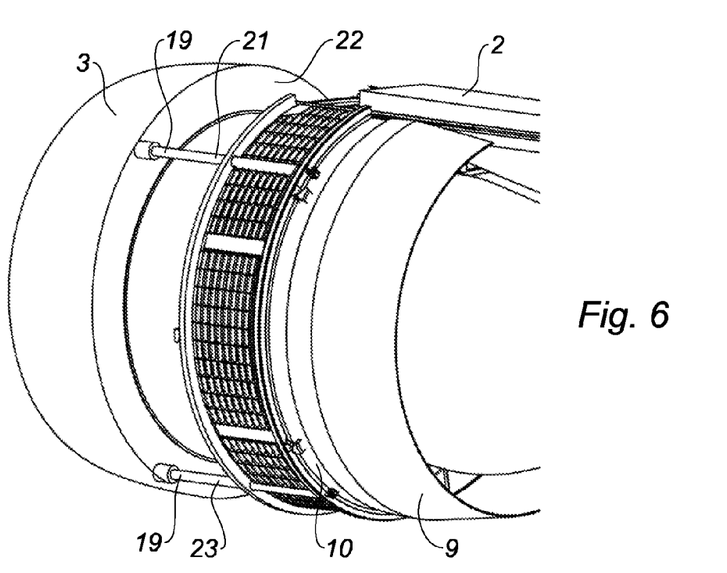
FIG. 6 represents the nacelle in an operating mode, in direct jet, centered on the actuating means.

We refer to FIG. 6 representing the nacelle, in the operating mode, in direct jet.

In a direct jet operation of the nacelle, the deflecting cascades 13 are enclosed inside the envelope formed by the cowl (not represented) and the fan housing 4 and connected to the external cowl 9.

The actuating means 11 comprise a plurality of control cylinders 19 supported at one of their ends by the downstream face 22 of the air inlet 3 of the nacelle 1, and connected at the other of their ends to the upstream face 10 of the external cowl 9. The cylinders can indifferently be supported at one of their ends by the fan housing 4 and connected at the other of their ends to the upstream face of the external cowl 9.

The control cylinders 19 comprise cylinders called higher cylinders 21 and cylinders called lower cylinders 23, the terms "higher" and "lower" should be understood by reference to the longitudinal axis of the nacelle 1 when the latter is connected to the engine pylon.

In this case, the control cylinders 19 are four, namely two higher cylinders 21 located near the block 2 of the engine pylon, and two lower cylinders 23 in an opposed area, but the number of the cylinders and their disposition may of course be different.

In order to move from a direct jet position to a reverse jet position, it is necessary to activate the actuating means 11.

The activation of these means is carried out by a unique control source not represented, connected to both the higher cylinders 21 and to the lower cylinders 23.

The control cylinders 19 stretches under the action of the control source, what results in the displacement of the external cowl 9 towards the downstream of the nacelle 1. The external cowl 9 is attached to the deflecting cascades 13 thanks to the fixing means 17, which, as a result drive together the unitary set formed by the external cowl and the deflecting cascades.

The deflecting cascades 13 are then uncovered and the flaps 15 are open, at least partially obstructing the air flow circulating the vein "V".

Figure 7:
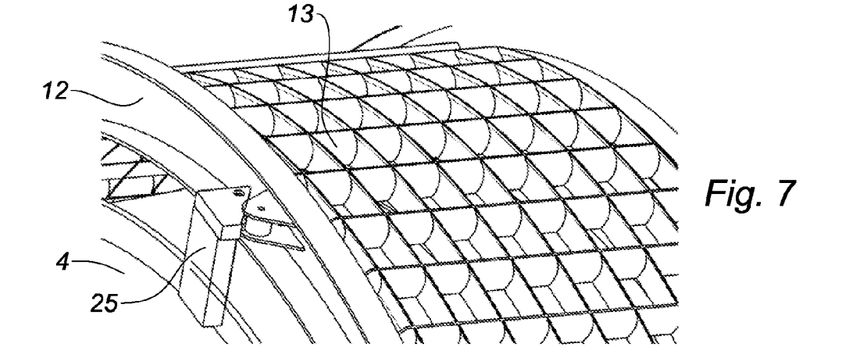
FIGS. 7 and 8 schematically represent the security locks of the deflecting cascades.
Figure 8:
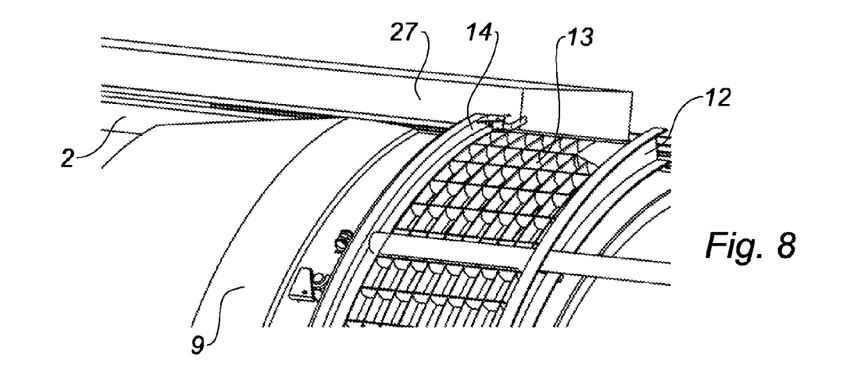

FIGS. 7 and 8 represent the connection between the deflecting cascades 13 and the fixed set of the nacelle.

In a direct jet operation of the nacelle, it is crucial that a sliding movement of the deflecting cascades 13 towards the downstream of the nacelle 1 cannot occur unexpectedly: such an opening would be, indeed, dangerous during a flight phase.

For these reasons, security locks 25 are provided at various locations of the nacelle to block the undesired opening of the external cowl 9 attached to the deflecting cascades 13.

This is typically a lock composed of a fixed body and of a bolt able to cooperate with a strike.

Such locking means are provided between the front frame 12 of the deflecting cascades 13 and the fan housing 4.

We can also provide locking means between the rear frame 14 and the cascades 13 and the engine pylon 27 connecting the nacelle 1 to a wing (not represented).

When it is desired to operate the thrust reverser, during the landing of an aircraft for example, one orders the unlocking of the security locks 25.

Independent sources of power and control are provided for these locks, so as to increase the reliability of the safety device.

Figure 9:
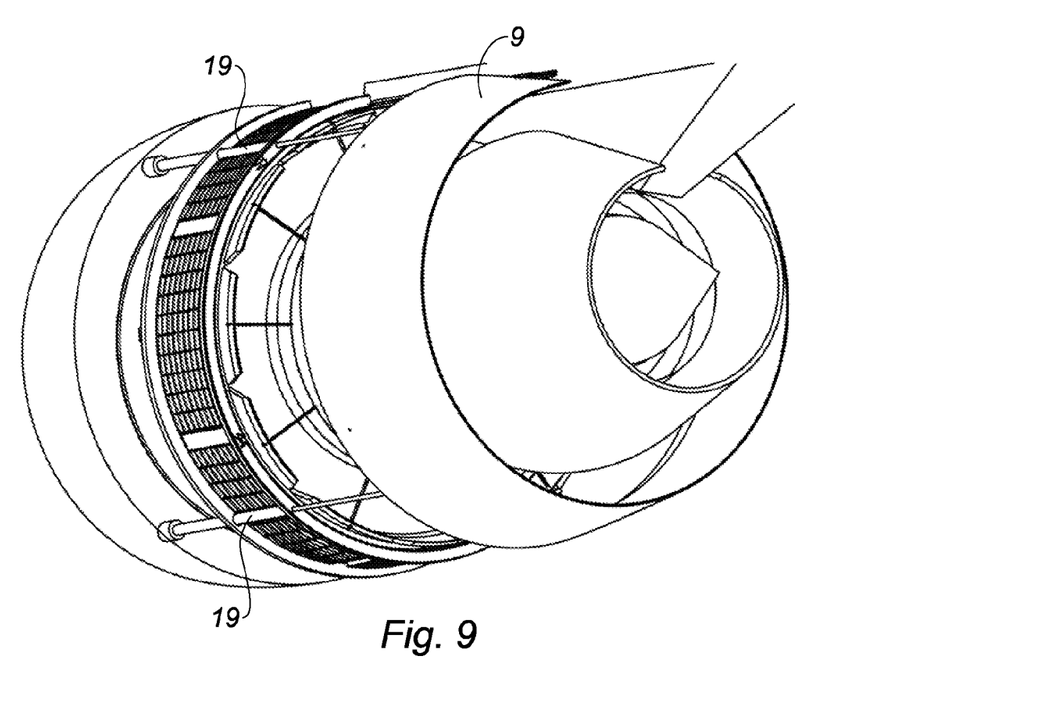
FIG. 9 is a view of the nacelle during maintenance operations, the opening of the external cowl being realized according to a first form.

One now refers to FIG. 9, illustrating a first form of a maintenance position of the nacelle 1 according to the present disclosure.

In order to achieve the maintenance of the engine, it is necessary to have an easy access to said engine. For this, the set of control cylinders 19 is supported at one of their ends by the downstream face 22 of the air inlet 3 of the nacelle 1, and connected at their other end to the upstream face 10 of the external cowl 9.

Deflecting cascades are disconnected from the external cowl by a manual opening of the fixing means 17, what allows, when activating the actuating means through a unique control system not represented, the opening of the cowl alone, the cascades remaining in the same position as that during the operation of the nacelle in direct jet.

Such a control system can be the one used when deploying the thrust reverser cowl when the nacelle is operating, but can also be achieved by any means, such as an external electrical power source or an external mechanical source for example.

The outer cowl is then in a downstream position, allowing thus an easy access to the engine.

The opening of the fixing means can be manually achieved, but it is not excluded to provide any control system allowing an automated opening of these fixing means 17.

The locking means 25 between the deflecting cascades and the fixed sets of the nacelle the nacelle remain in the closure position. This allows not having to manipulate them during maintenance operations.

Upon closing of the external cowl, the fixing means 17 between the cowl and the deflecting cascades are able to close again automatically.

Figure 10:
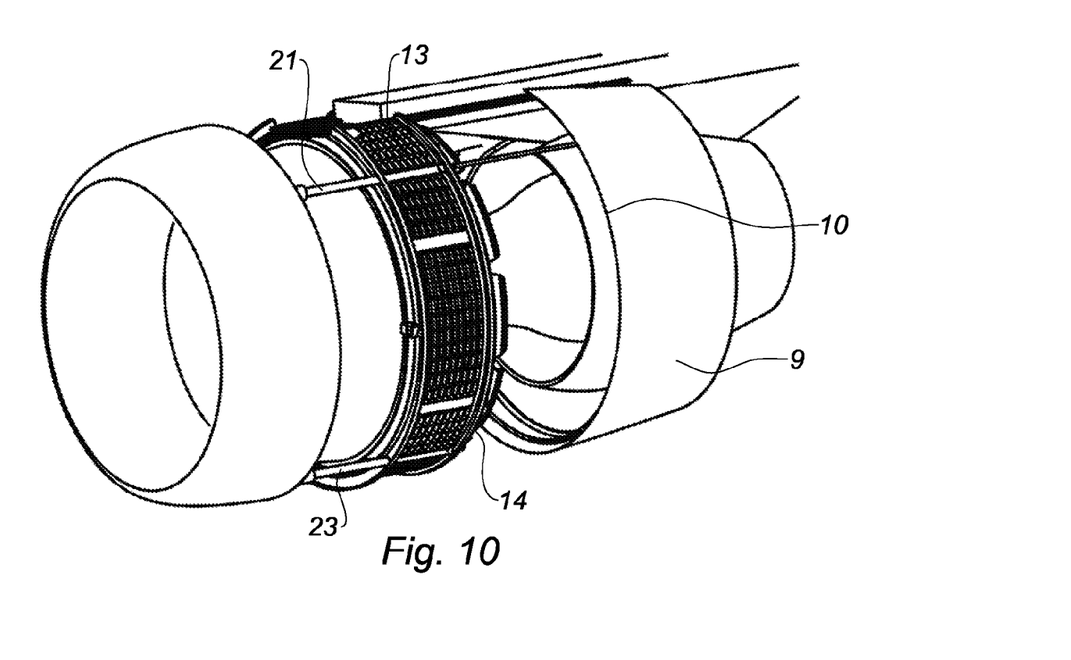
FIG. 10 is a view similar to that of FIG. 10, the opening of the external cowl being this time realized according to a second form.

According to a second form of a maintenance position of the nacelle 1 according to the present disclosure, only higher cylinders 23 are connected to the upstream face 10 of the external cowl 9, such as shown in FIG. 10.

The lower cylinders 23 are connected to the rear frame 14 of the deflecting cascades 13, the control system of the set of cylinders remaining connected to the lower cylinders 23 and higher cylinders 21.

According to the present disclosure, a clutch device allows momentarily disconnection of the lower cylinders 23 from the unique control system, which allows, when activating the actuating means 19, to drive the moving of the higher cylinders 21 connected to the external cowl 9, only.

The translation of the external cowl 9 to the downstream of the nacelle is then performed only by the higher cylinders 21, mechanically strong enough during maintenance operations.

Thanks to such a disposition, access to the engine is considerably improved, its access being only restricted by the higher cylinders 21.

One of the advantages of this alternative mode is that it is achievable, on the one hand, without an intervention in advance of an operator on the nacelle, and on the other hand, without adding any control system of the set of cylinders with respect to the functioning mode described previously. This also allows therefore the reduction of the weight of the nacelle.

Figure 11:
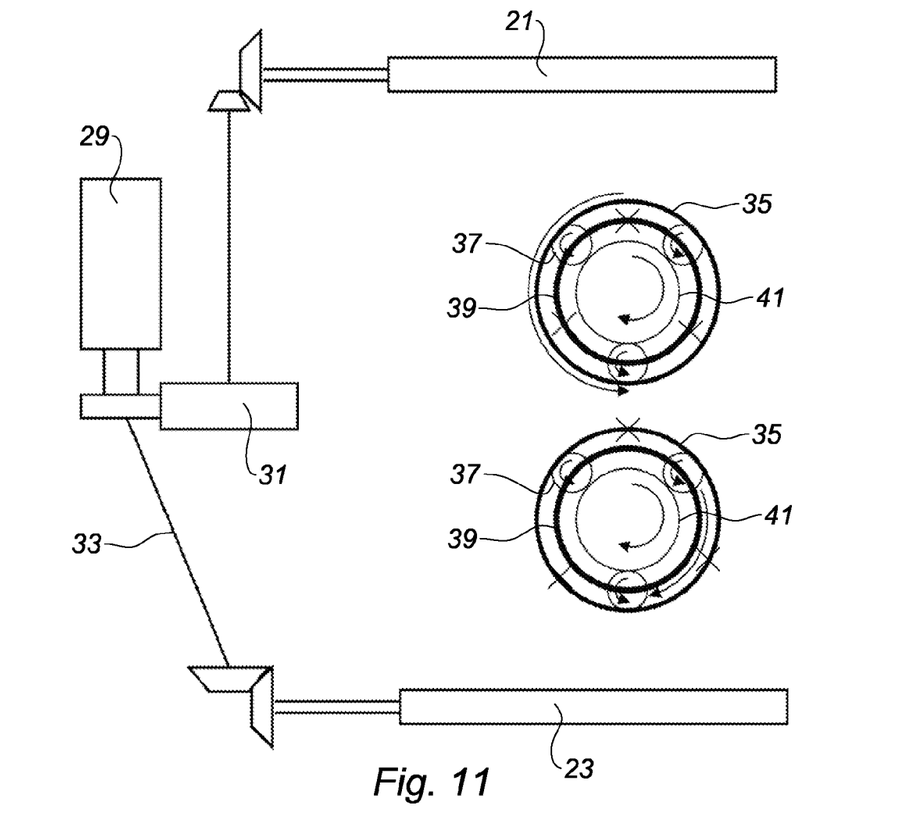
FIG. 11 represents the clutch device between the lower and higher cylinders equipping the nacelle according to the present disclosure.

The clutch device is detailed in FIG. 11, representing the control system (referenced 29 on FIG. 11) of the set of cylinders 19, connected on the one hand to a planetary gear 31 and on the other hand to the control flexible 33 of the lower cylinders 23.

The planetary gear 31 typically comprises a ring gear (Crown) 35, satellites 37 supported by a satellite holder 39, said satellites meshing on both the ring gear 35 and an interior planetary gear (central gear) 41.

In the functioning mode of the nacelle, the displacement of the external cowl 9 requires the activation of the higher cylinders 21 and the lower cylinders 23. The control system, for example an engine, is connected to the crown 35 of the planetary gear 31 and to the control flexible 33 of the lower cylinders 23. The lower cylinders 23 and the higher cylinders 21 are driven in translation when the lower cylinders are attached to the external cowl 9.

In maintenance position, lower cylinders 23 are connected to the rear frame of the deflecting cascades 13, locked with respect to the fixed parts by the locking means 25 what prevents the rotation of the ring gear 35. The control system 33 is connected to the satellites holder 39 which, when the control system 33 is activated, will drive the rotation of the interior planetary gear connected to the higher cylinders 21.

Figure 12:
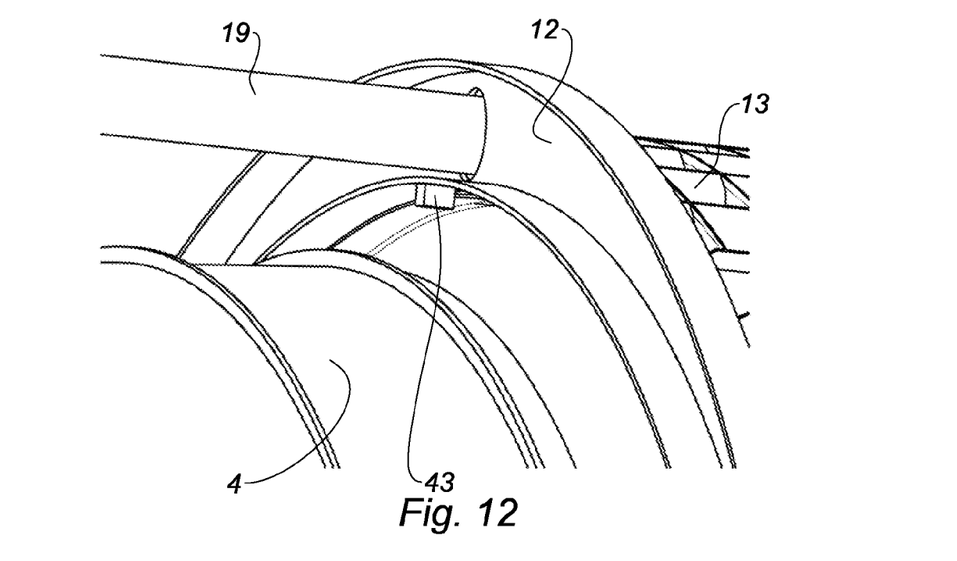
FIG. 12 represents the position of an axial abutment between the front frame of cascades and the fan housing.

We now refer to FIG. 12, representing a characteristic of the present disclosure according to which the axial abutments 43 are fixed between the fan housing 4 and the front frame 12, at different angular positions.

These abutments 43 allow the realization of the end of the run of the mobile set in reverse jet, the cylinders 19 being unable to integrate these abutments unless risking of not being able to perform then the course for the maintenance position, said course being higher than that needed to move from a closed position to an open position of the external cowl when functioning in reverse jet of the nacelle.

Advantageously, in an operation in reverse jet of the nacelle, axial efforts induced by deflecting cascades 13, flaps 15 and the external cowl 9 are transmitted directly to the fixed sets of the nacelle without passing through the cylinders 19, and can thus be better distributed angularly so as to limit the constraints concentrations in the structure.

Thanks to the present disclosure, there is a nacelle presenting both the advantages related to the nacelles, called short nacelles, very advantageous in terms of weight reduction, but also advantages concerning the accessibility to the engine during maintenance operations.

Thanks to the thrust reverser according to the present disclosure, it is no longer necessary to disable the security locks between the deflecting cascades and the fixed sets of the nacelle, and the access to the engine is further facilitated thanks to the lower cylinders disconnected from the control system in the maintenance position.

As it goes without saying, the present disclosure is not limited to the only forms of realization of this thrust reverser and this nacelle, described above as examples, but on the contrary, it embraces all variants.

What is claimed is:

1. A thrust reverser for a nacelle of a turbojet engine comprising:
   at least one external cowl translating from a closure position to an opening position;
   actuating means comprising a set of control cylinders, at least one control cylinder of said set of control cylinders being attached to each of the external cowl;
   thrust reversal means comprising deflecting cascades supported at an upstream end and a downstream end of said deflecting cascades by a front frame and a rear frame respectively, and said deflecting cascades being enclosed in an envelope formed by a fan housing and by a fan cowl; and
   a lock assembly configured to be locked or unlocked so as to attach said deflecting cascades on the external cowl or to separate said deflecting cascades from the external cowl,
   wherein an activation of the actuating means lead to the opening or closing positions of the external cowl, allowing a displacement of the external cowl and said deflecting cascades together when the locking assembly are locked, and a displacement of the external cowl alone when the locking assembly are unlocked.

2. The thrust reverser according to claim 1, wherein the set of control cylinders is activated by a control source.

3. The thrust reverser according to claim 1, wherein the set of control cylinders comprises at least one higher cylinder and at least one lower cylinder.

4. The thrust reverser according to claim 3, wherein said at least one higher cylinder is connected by an end thereof to an upstream face of the external cowl.

5. The thrust reverser according to claim 3, wherein the higher and lower cylinders are connected by an end of the higher cylinder and an end of the lower cylinder to an upstream face of the external cowl.

6. The thrust reverser according to claim 3, wherein said at least one lower cylinder is connected by an end thereof to the rear frame of the deflecting cascades.

7. The thrust reverser according to claim 3, wherein said at least one lower cylinder is able to be disconnected from the control source through a clutch device.

8. The thrust reverser according to claim 1, wherein the lock assembly comprise at least one lock attached to the external cowl and at least one receiving member attached to the deflecting cascades.

9. The thrust reverser according to claim 1, wherein deflecting cascades are, through security locks, attached to at least one of a fixed set of the nacelle and a connection interface with an engine pylon to which said nacelle is linked.

10. The thrust reverser according to claim 1, wherein axial abutments are fixed between the front frame of the deflecting cascades and a fixed set of the nacelle.

11. A nacelle for a turbojet aircraft comprising at least one thrust reverser according to claim 1.

* * * * *